United States Patent
Jung (10) Patent No.: US 10,087,802 B2
(45) Date of Patent: Oct. 2, 2018

(54) METHOD FOR CONTROLLING REGENERATION OF CATALYST

(71) Applicant: Hyundai Motor Company, Seoul (KR)

(72) Inventor: Chang Ho Jung, Gyeonggi-do (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 63 days.

(21) Appl. No.: 15/271,491

(22) Filed: Sep. 21, 2016

(65) Prior Publication Data
US 2017/0260886 A1    Sep. 14, 2017

(30) Foreign Application Priority Data
Mar. 14, 2016  (KR) .................. 10-2016-0030328

(51) Int. Cl.
| | |
|---|---|
| F01N 3/08 | (2006.01) |
| F01N 13/00 | (2010.01) |
| B01J 38/00 | (2006.01) |
| F01N 3/035 | (2006.01) |
| F01N 11/00 | (2006.01) |

(52) U.S. Cl.
CPC ............ *F01N 3/0885* (2013.01); *B01J 38/00* (2013.01); *F01N 3/035* (2013.01); *F01N 3/0821* (2013.01); *F01N 3/0842* (2013.01); *F01N 11/002* (2013.01); *F01N 13/009* (2014.06); *F01N 2550/02* (2013.01)

(58) Field of Classification Search
CPC .... F01N 3/0885; F01N 3/0842; F01N 3/0821; F01N 3/035; F01N 11/002; F01N 13/009; F01N 2550/02; B01J 38/00
See application file for complete search history.

(56) References Cited

FOREIGN PATENT DOCUMENTS

| | | |
|---|---|---|
| JP | 2004339967 A | 12/2004 |
| JP | 4640318 B2 | 3/2011 |
| JP | 2015151970 A | 8/2015 |
| KR | 10-2011-0024598 A | 3/2011 |
| KR | 1020120060372 A | 10/2012 |
| KR | 1020120060633 A | 4/2013 |
| KR | 10-1427919 B1 | 9/2014 |

OTHER PUBLICATIONS

Midlam-Mohler et al., Regeneration Control for a Bypass-Regeneration Lean NOx Trap System, Jun. 14-16, 2006, Proceedings of the American Control Conference, Minneapolis, MN, pp. 1203-1208.*

* cited by examiner

*Primary Examiner* — Toan Le
(74) *Attorney, Agent, or Firm* — Brinks Gilson & Lione (57) ABSTRACT

A method for controlling regeneration a catalyst by an exhaust gas purification device includes: measuring a temperature of exhaust gas flowing into a first catalyst unit; estimating a $NO_x$ amount loaded into the first catalyst unit and a slip amount of $NO_x$ of the first catalyst unit by using the temperature and an amount of the exhaust gas of the first catalyst unit; calculating a temperature of a second catalyst unit by using the temperature of the first catalyst unit; and estimating a $NO_x$ amount flowing into the second catalyst unit by using at least one of the slip amount of $NO_x$ of the first catalyst unit and the temperature of the second catalyst unit.

6 Claims, 7 Drawing Sheets

METHOD FOR CONTROLLING REGENERATION OF CATALYST

CROSS-REFERENCE TO RELATED APPLICATION

This application claims priority to and the benefit of Korean Patent Application No. 10-2016-0030328 filed on Mar. 14, 2016, the entire content of which is incorporated herein by reference.

FIELD

The present disclosure relates to a method for controlling regeneration of a catalyst by an exhaust gas purification device.

BACKGROUND

The statements in this section merely provide background information related to the present disclosure and may not constitute prior art.

In general, an exhaust system of an engine includes an exhaust gas after treatment apparatus such as a diesel oxidation catalyst (DOC), a diesel particulate matter filter (DPF), a selective catalyst reduction (SCR), a lean $NO_x$ trap (LNT), and the like in order to reduce carbon monoxide (CO), hydrocarbon (HC), particulate matters, nitrogen oxide ($NO_x$), and the like, which are pollutants contained in the exhaust gas.

The DOC may oxidize all hydrocarbons and carbon monoxide in the exhaust gas. The DOC may also oxidize nitrogen monoxide to nitrogen dioxide.

The DPF may trap particulate matters in the exhaust gas, and purify the particulate matters through a chemical conversion process.

Further, the SCR converts a reducing agent (urea), which is injected in the direction of the exhaust gas stream by an injector, into ammonia ($NH_3$) using heat of the exhaust gas, and reduces nitrogen oxide to nitrogen gas ($N_2$) and water ($H_2O$) by a catalyst reaction between nitrogen oxide in the exhaust gas and ammonia in the presence of an SCR catalyst.

However, we have discovered that in a high temperature and a high load condition, the $NO_x$ absorption efficiency of the LNT catalyst is deteriorated since there is a limit to the $NO_x$ purification performance.

Particularly, we have found that the temperature of the catalyst is increased more than about 400° C. in the high temperature and the high load condition and a large amount of $NO_x$ is flowed into the catalyst. Therefore, the $NO_x$ is not sufficiently absorbed by the LNT catalyst and exhausted.

SUMMARY

The present disclosure provides a method for controlling the regeneration of a catalyst by an exhaust gas purification device having advantages of purifying an exhaust gas by disposing the LNT catalyst on the DPF.

According to one aspect of the present disclosure a method for controlling regeneration of a catalyst by an exhaust gas purification device is provided The method generally includes: measuring a temperature of an exhaust gas flowing into a first catalyst unit; estimating a $NO_x$ amount loaded into the first catalyst unit and a slip amount of $NO_x$ of the first catalyst unit by using the temperature and an amount of the exhaust gas of the first catalyst unit; calculating a temperature of a second catalyst unit a by using the temperature of the first catalyst unit; and estimating a $NO_x$ amount flowing into the second catalyst unit by using at least one of the slip amount of $NO_x$ of the first catalyst unit and the temperature of the second catalyst unit.

The method may further include determining the regeneration of the first catalyst unit or the second catalyst unit by using at least one of selected from the group consisting of the $NO_x$ amount loaded into the first catalyst unit, the temperature of the first catalyst unit, and the temperature of the second catalyst unit.

The step of determining the regeneration may include comparing an amount of nitrogen oxide flowing into the first catalyst unit with a first threshold value.

The step of determining the regeneration may further include comparing the temperature of the first catalyst unit with a second threshold value when the amount of nitrogen oxide flowing into the first catalyst unit is greater than the first threshold value; and comparing the temperature of the second catalyst unit with a third threshold value.

The step of determining the regeneration may further include controlling the regeneration of both the first catalyst unit and the second catalyst unit when the temperature of the first catalyst unit is greater than the second threshold value and the temperature of the second catalyst unit is greater than the third threshold value.

The step of determining the regeneration may further include controlling the regeneration of only the first catalyst unit when the temperature of the first catalyst unit is greater than the second threshold value and the temperature of the second catalyst unit is less than the third threshold value.

The step of determining the regeneration may further include controlling only the second catalyst unit to be regenerated when the temperature of the first catalyst unit is less than the second threshold value and the temperature of the second catalyst unit is greater than the third threshold value.

The first catalyst unit may be installed at an exhaust pipe and may include a first LNT catalyst, and the second catalyst unit may be installed at the exhaust pipe at a rear end of the first catalyst unit and may include a second LNT catalyst coated on a DPF.

According to another aspect of the present disclosure, the second LNT catalyst may be coated on the DPF disposed at a rear end of the first LNT catalyst. Upon controlling the regeneration of the first LNT catalyst and the second LNT catalyst according to the temperature of the catalyst, it is possible to improve $NO_x$ absorption efficiency and purification efficiency of the exhaust gas.

Further areas of applicability will become apparent from the disclosure provided herein. It should be understood that the description and specific examples are intended for purposes of illustration only and are not intended to limit the scope of the present disclosure

DRAWINGS

In order that the disclosure may be well understood, there will now be described various forms thereof, given by way of example, reference being made to the accompanying drawings, in which.

DETAILED DESCRIPTION

The following detailed description is merely exemplary in nature, and is not intended to limit the present disclosure, application, or uses. Reference is made in detail to various forms of the present disclosure, examples of which are shown and described, simply by way of illustration. As those skilled in the art would realize, the described various forms may be modified in various different ways, all without departing from the spirit or scope of the present invention.

Throughout the specification, unless explicitly described to the contrary, the word "comprise" and variations such as "comprises" or "comprising" will be understood to imply the inclusion of stated elements but not the exclusion of any other elements.

Parts indicated by like reference numerals are the same components throughout the specification.

It is understood that the term "vehicle" or "vehicular" or other similar terms as used herein is inclusive of motor vehicles in general such as passenger automobiles including, without limitation, sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative fuel vehicles (e.g., fuel derived from resources other than petroleum).

In addition, some methods may be executed by at least one controller. The term "controller" refers to a hardware device including a memory and a processor configured to execute one or more steps interpreted as an algorithm structure. The memory stores algorithm steps, and the processor specifically executes the algorithm steps to perform one or more processes to be described below.

Further, control logic of the present disclosure may be implemented by a non-transient computer-readable medium on a computer-readable means including executable program instructions executed by a processor, a controller, or the like. Examples of a computer-readable medium, although not restrictive, include ROMs, RAMs, CD-ROMs, magnetic tapes, floppy disks, flash drives, smart cards, and optical data storages. The computer-readable recording medium may be distributed in a network-connected computer system, and for example, may be stored and executed in a distributed manner by a telematics server or Controller Area Network (CAN).

Figure 1:
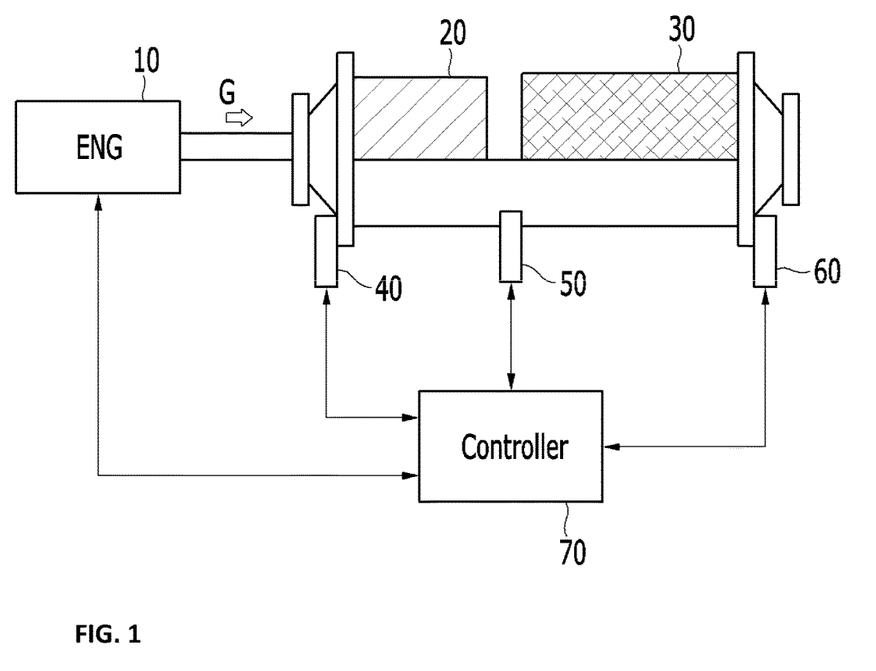
FIG. 1 is a schematic diagram of an exhaust gas purification device according to one aspect of the present disclosure.

A method for controlling regeneration of the exhaust gas purification device is described with reference to FIG. 1 to FIG. 6. In FIG. 1, a schematic diagram of an exhaust gas purification device according to one aspect of the present disclosure is shown. In this case, for convenience of explanation, a configuration of the exhaust gas purification device according to this aspect of the present disclosure is schematically illustrated, but the diesel engine is not limited thereto.

Referring to FIG. 1, the exhaust gas purification device according to one aspect of the present disclosure includes a first catalyst unit 20 connected with an engine 10, a second catalyst unit 30 and a controller 70.

The first catalyst unit 20 is installed at an exhaust pipe flowing into exhaust gas G of the engine 10. The first catalyst unit 20 may include a first LNT (Lean $NO_x$ Trap) catalyst according to the teachings of the present disclosure.

The second catalyst unit 30 is installed at the exhaust pipe at a rear end of the first catalyst unit 20. The second catalyst unit 30 includes a DPF (Diesel Particulate Filter) and a second LNT catalyst. The second LNT catalyst may be coated on the DPF according to another aspect of the present disclosure.

The second LNT catalyst of the second catalyst unit 30 may additionally purify the $NO_x$ slipped from first LNT catalyst of the first catalyst unit 20. Herein, a distance between a rear end of the first catalyst unit 20 and a front end of the second catalyst unit 30 is within about 80 cm, and a temperature for regeneration of the second catalyst unit 30 and desulfurization ($deSO_x$) can be ensured through the distance.

Figure 2:
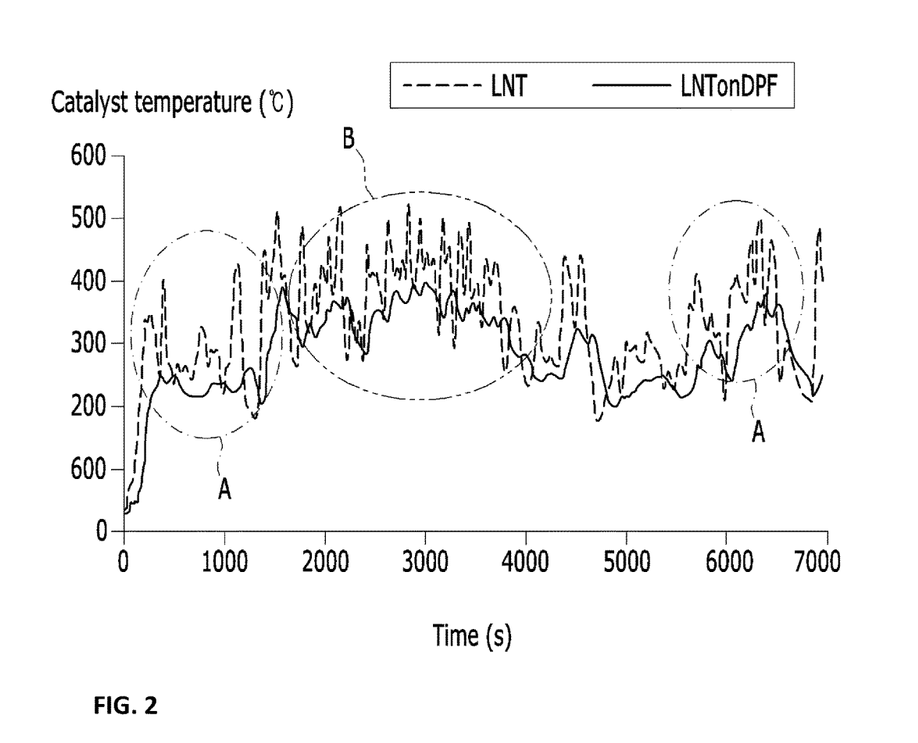
FIG. 2 is a cross-sectional view of a second catalyst unit according to another aspect of the present disclosure.

Referring now to FIG. 2, a cross-sectional view of a second catalyst unit according to one aspect of the present disclosure is shown. In FIG. 2, a temperature of the second catalyst unit 30 is lower than a temperature of the first catalyst unit 20. A temperature change of the second catalyst unit 30 is smaller than a temperature change of the first catalyst unit 20. Therefore the second catalyst unit 30 is advantageous for trapping $NO_x$.

Accordingly, the exhaust gas purification device according to the teachings of the present disclosure can reduce the temperature for trapping $NO_x$, and reduce desorption of $NH_3$ caused by heat of the rapid increase in temperature.

The exhaust gas purification device according to another aspect of the present disclosure may also include a first lambda sensor 40, a second lambda sensor 50, and a third lambda sensor 60.

Referring once again to FIG. 1, the first lambda sensor 40 is disposed at a front end of the first catalyst unit 20. The second lambda sensor 50 may be disposed between the first catalyst unit 20 and the second catalyst unit 30. The third lambda sensor 60 can be disposed at a rear end of the second catalyst unit 30.

The controller 70 controls operation of the engine 10, and controls regeneration of the first LNT catalyst and the second LNT catalyst by using information received from the first lambda sensor 40, the second lambda sensor 50 and the third lambda sensor 60.

Referring again to FIG. 2, the regeneration range may be divided into a range A in which only the first catalyst unit can be regenerated and a range B in which both the first LNT catalyst and the second LNT catalyst can be regenerated.

The controller 70 controls both the first LNT catalyst and the second LNT catalyst to be regenerated, and controls the first LNT catalyst or the second LNT catalyst to be regenerated, respectively.

Accordingly, by disposing second lambda sensor 50 between the first catalyst unit 20 and the second catalyst unit 30, the exhaust gas purification device according to one aspect of the present disclosure can divide regeneration of the first LNT catalyst and regeneration of the second LNT catalyst. To this end, the controller 70 may be realized by one or more processors activated by a predetermined program. The predetermined program may be programmed to perform each step of a method for controlling regeneration of a catalyst according to the teachings of the present disclosure.

Figure 3:
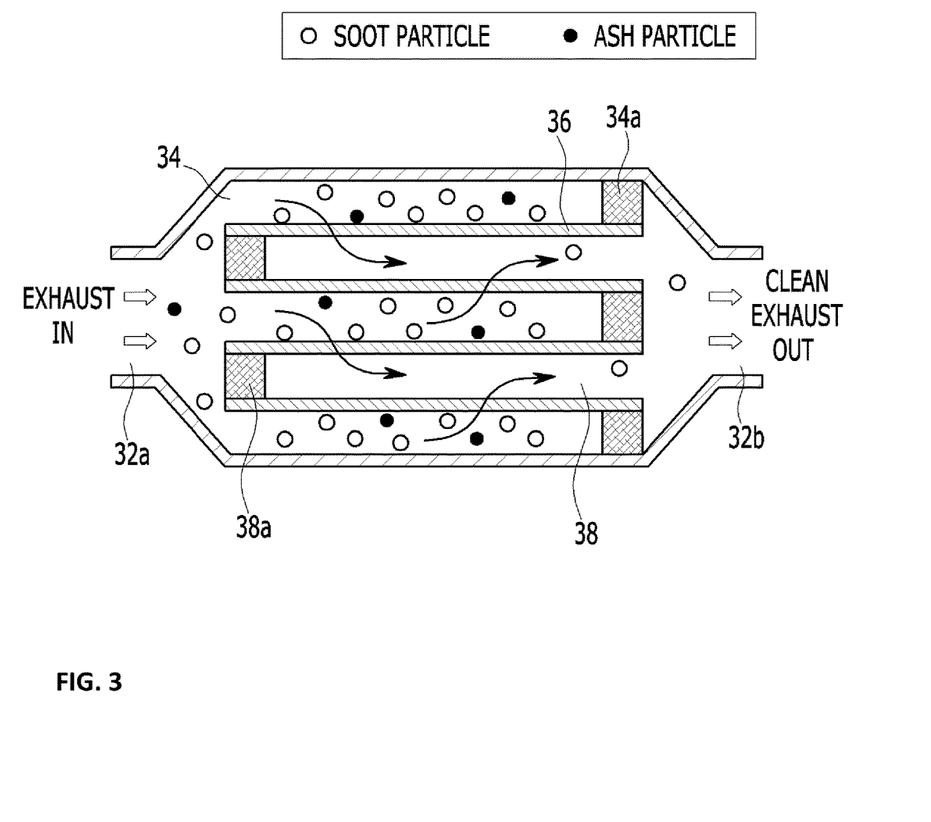
FIG. 3 is a graph comparing a temperature of a first LNT catalyst and a second catalyst coated on the DPF.

Referring now to FIG. 3, a graph comparing a temperature of a first LNT catalyst and a second catalyst coated on the DPF according to one aspect of the present disclosure is shown. In this case, for convenience of explanation, a configuration of the second catalyst unit according to the teachings of the present disclosure is schematically illustrated, but the diesel engine is not limited thereto.

Still referring to FIG. 3, the second catalyst unit 30 according to one aspect of the present disclosure includes one or more inflow channels 34 and one or more outflow channels 38. Filter units 36 may be disposed between the inflow channels 34 and the outflow channels 38.

Front ends of the inflow channel 34 are open, and the exhaust gas of an inlet 32a is introduced into the second catalyst unit 30 via the inflow channel 34. Rear ends of the inflow channels 34 are blocked by first plugs 34a.

Front ends of the outflow channels 38 are blocked by second plugs 38a. Rear ends of the outflow channels 38 are open, and the exhaust gas in the second catalyst unit 30 flows to outlet 32b via the oufflow channels 38.

The filter units 36 are disposed between the inflow channels 34 and the oufflow channels 38. The exhaust gas that is introduced into the inflow channels 34 can be pass to the outflow channels 38 via the filter units 36. The second LNT catalyst can be coated on at least one side of the filter units 36. In this case, the first LNT catalyst of the first catalyst unit 20 and the second LNT catalyst of the second catalyst unit 30 include at least one of $CeO_2$, Pt, Rh and Ba.

Herein, the content of $CeO_2$ of the second LNT catalyst of the second catalyst unit 30 is higher than the content of $CeO_2$ of the first LNT catalyst of the first catalyst unit 20 by more than 10%. Accordingly, the exhaust gas purification device according to an exemplary embodiment of the present invention can accelerate the reaction of $NO_x$ and $SO_x$ by increasing heat generation in a rich condition In addition, the content of Pt of the second LNT catalyst of the second catalyst unit 30 is higher than the content of Pt of the first LNT catalyst of the first catalyst unit 20 by more than 10%. Accordingly, the exhaust gas purification device according to one aspect of the present disclosure can increase heat generation and increase a reaction point of CO, HC and the $NO_x$.

In addition, the content of Rh of the second LNT catalyst of the second catalyst unit 30 is higher than the content of Rh of the first LNT catalyst of the first catalyst unit 20 by more than 10%. Accordingly, the exhaust gas purification device according to one aspect of the present disclosure can enhance a reaction of the $NO_x$ and $N_2$ at low temperatures.

In order to improve absorption and purification efficiency at high exhaust temperatures, the content of $CeO_2$ of the second LNT catalyst of the second catalyst unit 30 may be lower than the content of $CeO_2$ of the first LNT catalyst of the first catalyst unit 20 by more than 10%, and the content of Ba of the second LNT catalyst of the second catalyst unit 30 may be higher than the content of Ba of the first LNT catalyst of the first catalyst unit 20 by more than 10%.

Figure 4A:
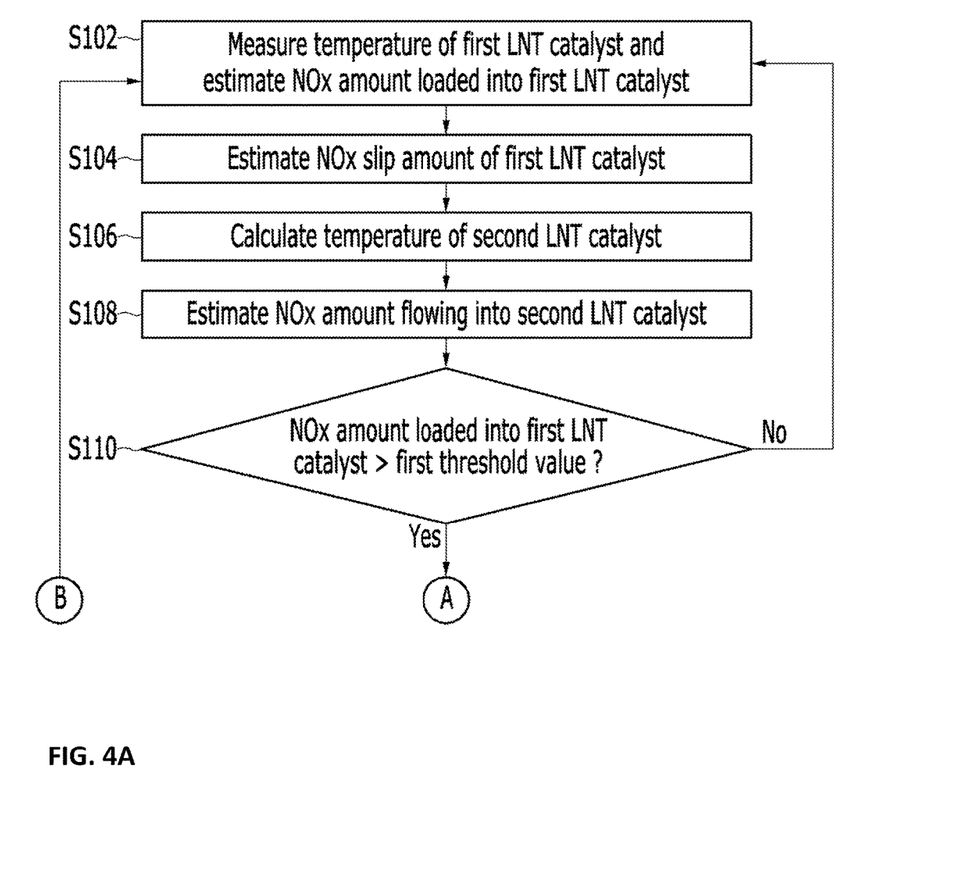
FIG. 4A and FIG. 4B are flowcharts that describe a process for controlling regeneration of a catalyst by an exhaust gas purification device according to the teachings of the present disclosure.
Figure 4B:
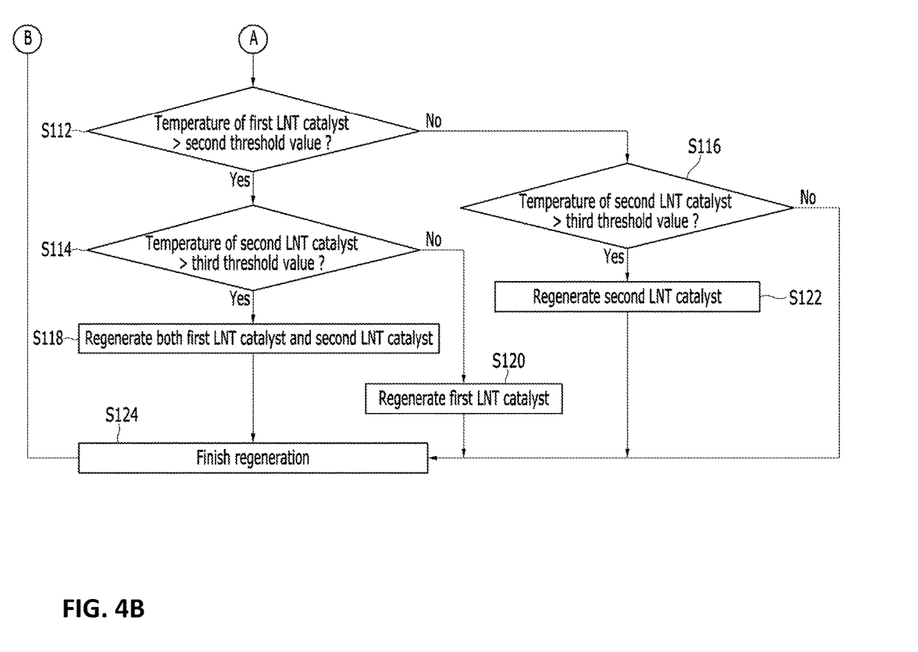

Referring now to FIG. 4A and FIG. 4B flowcharts that describe a process for controlling regeneration of a catalyst by an exhaust gas purification device according to the teachings of the present disclosure are provided. The flowcharts are described using the same reference numerals as those of the configurations shown in FIG. 1 to FIG. 3.

Referring to FIG. 4A and FIG. 4B, the exhaust gas purification device according to one aspect of the present disclosure measures the temperature of the first LNT catalyst at step S102.

The exhaust gas purification device estimates a $NO_x$ amount loaded into the first catalyst unit and a slip amount of $NO_x$ of the first catalyst by using the temperature and an amount of the exhaust gas of the first LNT catalyst at step S104.

The exhaust gas purification device calculates the temperature of the second LNT catalyst depends on the temperature of the first LNT catalyst, and estimates a $NO_x$ amount flowing into the second catalyst unit by using the slip amount of $NO_x$ of the first catalyst unit and the temperature of the second catalyst unit at steps S106 and S108.

When the $NO_x$ amount loaded into the first catalyst unit is greater than a first threshold value, the exhaust gas purification device compares the temperature of the first catalyst unit with a second threshold value, and compares the temperature of the second catalyst unit with a third threshold value at steps S110 to S116.

When the temperature of the first catalyst unit is greater than the second threshold value and the temperature of the second catalyst unit is greater than the third threshold value, the exhaust gas purification device controls the regeneration of both the first catalyst unit and the second catalyst unit at step S118.

When the temperature of the first catalyst unit is greater than the second threshold value and the temperature of the second catalyst unit is less than the third threshold value, the exhaust gas purification device controls the regeneration of only the first catalyst unit at step S120.

When the temperature of the first catalyst unit is less than the second threshold value and the temperature of the second catalyst unit is greater than the third threshold value, the exhaust gas purification device controls the regeneration of only the second catalyst unit at step S122.

When the temperature of the first catalyst unit is less than the second threshold value and the temperature of the second catalyst unit is less than the third threshold value, the exhaust gas purification device defers the regeneration of the first catalyst unit and the second catalyst unit and finishes the operation of the regeneration at step S124.

Figure 5:
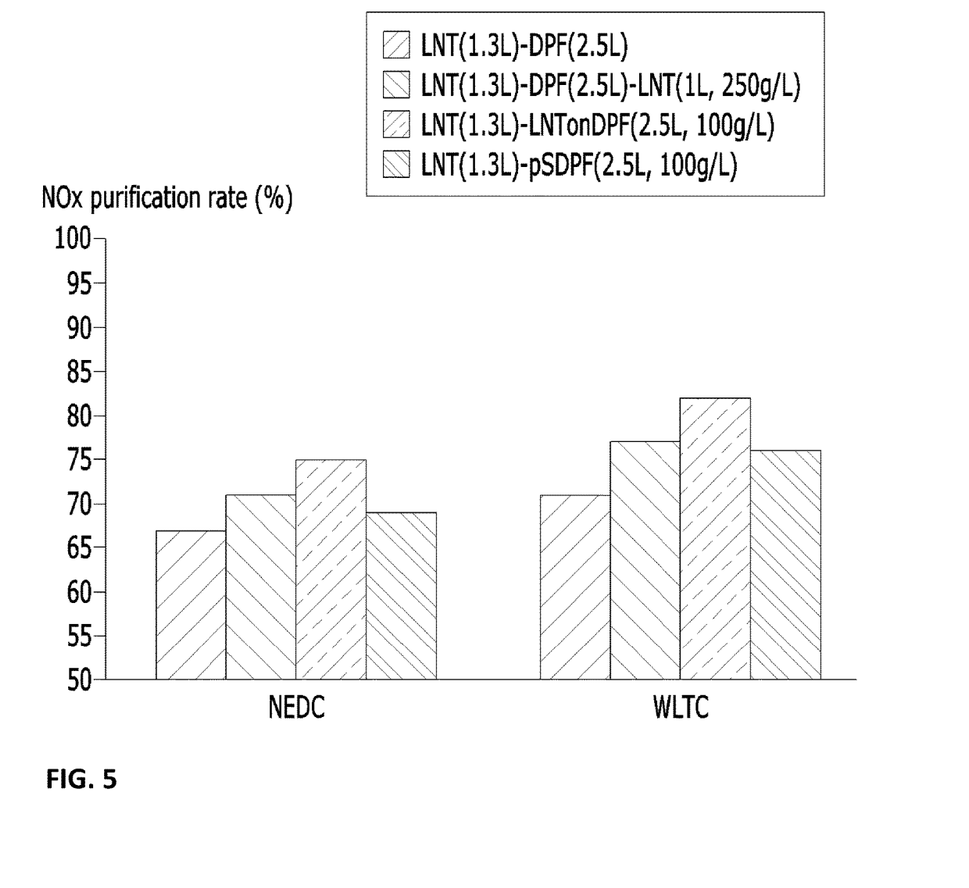
FIG. 5 is a graph comparing $NO_x$ purification performance according to a catalyst structure.

Referring now to FIG. 5, a graph comparing a $NO_x$ purification performance according to a catalyst structure is provided. In addition, FIG. 6 provides a graph comparing a $NO_x$ purification performance according to the number of lambda sensors.

In FIG. 5, the exhaust gas purification device according to one aspect of the present disclosure forms a composite catalyst (LNT on DPF) at a rear end of the LNT catalyst, thereby improving the $NO_x$ purification performance.

Figure 6:
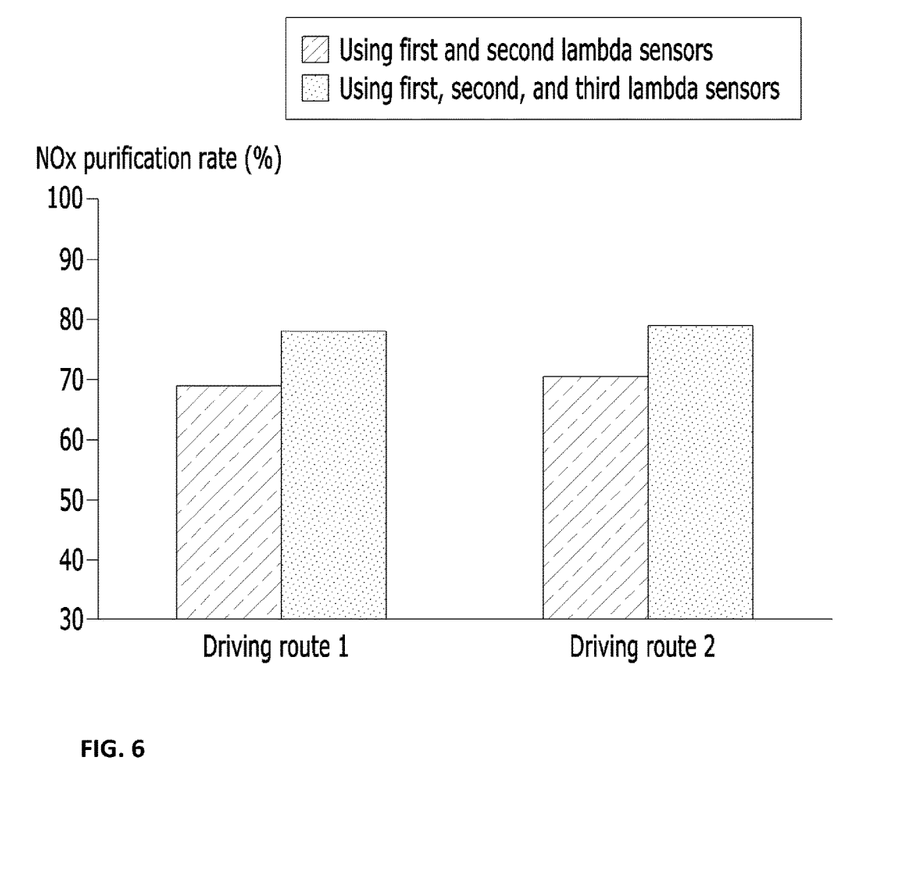
FIG. 6 is a graph comparing a $NO_x$ purification performance according to the number of lambda sensors.

In FIG. 6, the exhaust gas purification device according to one aspect of the present disclosure forms the second lambda sensor 50 between the first LNT catalyst and the second LNT catalyst, thereby separately controlling the regeneration of the first LNT catalyst and the regeneration of the second LNT catalyst and improving a purification rate.

The exhaust gas purification device according to the teachings of the present disclosure coats the second LNT catalyst on the DPF disposed at a rear end of the first LNT catalyst, and controls the regeneration of the first LNT catalyst and the second LNT catalyst according to the temperature of the catalyst. Therefore, it is possible to improve $NO_x$ absorption efficiency and purification efficiency of the exhaust gas.

The foregoing examples of the present disclosure are not implemented only by an apparatus and a method, and therefore may be realized by programs realizing functions corresponding to the configuration of the various forms of the present disclosure or recording media on which the programs are recorded.

While this disclosure has been described in connection with what is presently considered to be practical examples, it is to be understood that the disclosure is not limited to these specific examples, but, on the contrary, is intended to cover various modifications and equivalent arrangements included within the spirit and scope of the appended claims.

What is claimed is:

1. A method for controlling regeneration of a catalyst by an exhaust gas purification device, the method comprising:
   measuring a temperature of an exhaust gas flowing into a first catalyst unit;
   estimating, by a controller, a $NO_x$ amount loaded into the first catalyst unit and a slip amount of $NO_x$ of the first catalyst unit by using the temperature and an amount of the exhaust gas of the first catalyst unit;
   calculating, by a controller, a temperature of a second catalyst unit by using the temperature of the first catalyst unit;
   estimating, by a controller, a $NO_x$ amount flowing into the second catalyst unit by using at least one of the slip amount of $NO_x$ of the first catalyst unit and the temperature of the second catalyst unit; and
   determining, by the controller, regeneration of the first catalyst unit or the second catalyst unit by using at least one of selected from the group consisting of the $NO_x$ amount loaded into the first catalyst unit, the temperature of the first catalyst unit, and the temperature of the second catalyst unit;
   wherein the first catalyst unit is installed at an exhaust pipe and includes a first LNT (lean $NO_x$ trap) catalyst, and the second catalyst unit is installed at the exhaust pipe at a rear end of the first catalyst unit and includes a second LNT catalyst coated on a DPF (diesel particulate matter filter).

2. The method of claim 1, wherein the step of determining regeneration includes comparing an amount of nitrogen oxide flowing into the first catalyst unit with a first threshold value.

3. The method of claim 2, wherein the step of determining regeneration further includes:
   comparing the temperature of the first catalyst unit with a second threshold value when the amount of nitrogen oxide flowing into the first catalyst unit is greater than the first threshold value; and
   comparing the temperature of the second catalyst unit with a third threshold value.

4. The method of claim 3, wherein the step of determining regeneration further includes controlling the regeneration of both the first catalyst unit and the second catalyst unit when the temperature of the first catalyst unit is greater than the second threshold value and the temperature of the second catalyst unit is greater than the third threshold value.

5. The method of claim 3, wherein the step of determining regeneration further includes controlling the regeneration of only the first catalyst unit when the temperature of the first catalyst unit is greater than the second threshold value and the temperature of the second catalyst unit is less than the third threshold value.

6. The method of claim 3, wherein the step of determining regeneration further includes controlling only the second catalyst unit to be regenerated when the temperature of the first catalyst unit is less than the second threshold value and the temperature of the second catalyst unit is greater than the third threshold value.

* * * * *